(12) United States Patent
Mishra et al.

(10) Patent No.: US 12,007,740 B2
(45) Date of Patent: Jun. 11, 2024

(54) SECURE NETWORK OF SAFETY PLCS FOR INDUSTRIAL PLANTS

(71) Applicant: Schneider Electric Systems USA, Inc., Foxborough, MA (US)

(72) Inventors: Ajay Mishra, Lake Forest, CA (US); Diana Ivanov, Rancho Santa Margarita, CA (US); Erna Banchik, Rancho Santa Margarita, CA (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 0 days.

(21) Appl. No.: 17/121,177

(22) Filed: Dec. 14, 2020

(65) Prior Publication Data

US 2021/0200178 A1 Jul. 1, 2021

Related U.S. Application Data

(60) Provisional application No. 62/955,776, filed on Dec. 31, 2019.

(51) Int. Cl.
*G05B 19/05* (2006.01)

(52) U.S. Cl.
CPC ......... *G05B 19/058* (2013.01); *G05B 19/052* (2013.01); *G05B 19/056* (2013.01)

(58) Field of Classification Search
CPC ... G05B 19/058; G05B 19/052; G05B 19/056
(Continued)

(56) References Cited

U.S. PATENT DOCUMENTS

| 2002/0129296 A1 | 9/2002 | Kwiat et al. |
| 2004/0210326 A1* | 10/2004 | Muneta ................ G05B 19/058 700/82 |

(Continued)

FOREIGN PATENT DOCUMENTS

| EP | 2966520 A2 | 1/2016 |
| EP | 2966806 A1 | 1/2016 |

(Continued)

OTHER PUBLICATIONS

BooHyung Lee, Blockchain-based secure firmware update for embedded devices in an Internet of Things environment, Sep. 13, 2016, Spring Science (Year: 2016).*

(Continued)

*Primary Examiner* — Christopher W Carter
(74) *Attorney, Agent, or Firm* — Locke Lord LLP

(57) ABSTRACT

Network of safety PLCs employs multi-PLC verification of a programming application before allowing the application to reprogram any PLC on the safety network. Each PLC on the safety network is equipped with authentication capability that detects attempts to reprogram the PLC and issues an authentication challenge requiring the programming application to process a proof-of-work. The authentication challenge is also sent to other PLCs on the safety network along with the response from the programming application for verification purposes. The other PLCs process the authentication challenge and check the response from the programming application for acceptability. If a majority of the PLCs on the safety network determines the response from the programming application is correct, then the programming application is verified and may proceed with the reprogramming. Such group authentication requires a malicious application to hijack multiple PLCs concurrently on the safety (Continued)

network, a highly unlikely outcome, before reprogramming any PLC.

17 Claims, 4 Drawing Sheets

(58) Field of Classification Search
 USPC .......................................................... 700/79
 See application file for complete search history.

(56) References Cited

U.S. PATENT DOCUMENTS

2019/0297095 A1* 9/2019 Formby ............... G05B 19/058
2019/0340269 A1* 11/2019 Biernat .................. G06F 16/27
2020/0235943 A1* 7/2020 Salimi ...................... G06F 8/65

FOREIGN PATENT DOCUMENTS

EP          2966520 A3    6/2016
EP          3438829 A1    2/2019

OTHER PUBLICATIONS

European Search Report for EP Application No. 20213710, dated May 17, 2021, 9 pages.

* cited by examiner

SECURE NETWORK OF SAFETY PLCS FOR INDUSTRIAL PLANTS

CROSS-REFERENCE TO RELATED APPLICATIONS

This application for patent claims the benefit of priority to and incorporates herein by reference U.S. Provisional Application No. 62/955,776, entitled "Secure Network of Safety PLCS for Industrial Plants," filed Dec. 31, 2019.

TECHNICAL FIELD

The present disclosure relates to safety systems for industrial plants and more particularly to methods and systems for implementing a network of safety PLCs for an industrial plant that provides improved protection from cyber-attacks and other cyber security threats.

BACKGROUND

Modern industrial plants employ automated processes to improve efficiency and reliability as well as limit interaction between plant personnel and process machinery and equipment for safety reasons. The latter is particularly important in plants that process hazardous materials, such as oil and gas refineries, chemical plants, nuclear power plants, and the like. The process automation often takes the form of PLCs (programmable logic controllers) and the like that monitor and control the plant machinery and equipment and the associated processes.

In addition to process PLCs, many modern industrial plants also employ a safety system as an added layer of protection in the event of a process PLC failure or malfunction. The safety system usually does not control any plant processes, but instead operates to ensure some safety measure is performed, such as shutting off power, venting a gas, activating sprinklers, and the like, when a process PLC breaks down or can no longer properly control a process. Such safety systems help protect not only plant personnel, but also the environment and the plant itself from catastrophic damage.

Most industrial safety systems employ the same or a similar type of PLCs as the process PLCs, except the safety PLCs are programmed to perform specific safety functions rather than process control functions. These safety PLCs, like the process PLCs, can be reprogrammed or updated with new program code by an authorized programming application from time to time as needed. However, if a malicious application were able to gain access to the safety PLCs, for example, via a man-in-the-middle attack or other type of cyber-attack, the malicious application could alter the programming of the safety PLCs. The compromised safety PLCs would no longer be able to respond as originally intended, thereby putting the plant in significantly increased danger or risk of an accident or other industrial disaster.

Thus, while a number of advances have been made in industrial safety systems, it will be readily appreciated that improvements are continually needed.

SUMMARY

The present disclosure relates to systems and methods for implementing a secure network of safety PLCs for an industrial plant. The network of safety PLCs employs multi-PLC verification of a programming application before allowing the application to reprogram any safety PLC on the safety network. Each safety PLC on the safety network is equipped with authentication capability that detects attempts to reprogram the safety PLC and issues an authentication challenge requiring the programming application to process or otherwise solve a proof-of-work (PoW). The safety PLC then sends the authentication challenge to other safety PLCs on the safety network along with the response provided by the programming application for verification purposes. The other safety PLCs process the authentication challenge and check the response from the programming application for acceptability. If a majority of the safety PLCs on the safety network determines that the response from the programming application is correct, then the programming application is verified and allowed to proceed with the reprogramming. Such group authentication would force a malicious application to hijack multiple safety PLCs concurrently on the safety network, which is a low feasibility event at best, in order to reprogram any one of the safety PLCs.

In general, in one aspect, embodiments of the present disclosure relate to a safety system for an industrial plant. The system comprises, among other things, a safety network in the industrial plant, and a plurality of safety programmable logic controllers (PLCs) coupled to communicate with one another over the safety network, each safety PLC operable to perform one or more safety functions related to equipment in the industrial plant. Each safety PLC is operable to initiate multi-PLC authentication of a programming application in response to a request by the programming application to download PLC programming to a safety PLC.

In accordance with any one or more of the foregoing embodiments, each safety PLC is operable to initiate multi-PLC authentication by issuing an authentication challenge to the programming application, receiving a response to the authentication challenge from the programming application, providing the authentication challenge and the response from the programming application to other safety PLCs coupled to communicate over the safety network for verification, receiving verification results from the other safety PLCs coupled to communicate over the safety network, and allowing the programming application to download the PLC programming to the safety PLC if a minimum number of safety PLCs coupled to communicate over the safety network has verified that the response from the programming application is acceptable.

In accordance with any one or more of the foregoing embodiments, the minimum number of safety PLCs is a majority of the safety PLCs coupled to communicate over the safety network.

In accordance with any one or more of the foregoing embodiments, each safety PLC is further operable to verify the response to the authentication challenge from the programming application and provide a verification result to the other safety PLCs coupled to communicate over the safety network.

In accordance with any one or more of the foregoing embodiments, the authentication challenge takes the form of a PoW that is related to a functionality of the programming application, and each safety PLC is further operable to select the PoW from a list of predefined PoWs for the programming application stored in each safety PLC.

In general, in another aspect, embodiments of the present disclosure relate to a safety PLC for an industrial plant. The safety PLC comprises, among other things, a processor, and a network interface connected to the processor, the network interface allowing the safety PLC to communicate with other safety PLCs in the industrial plant over a safety network. The safety PLC further comprises a storage device connected to the processor, the storage device storing computer-readable instructions thereon that, when executed by the processor, cause the processor to initiate multi-PLC authentication of a programming application in response to a request by the programming application to download PLC programming to the safety PLC.

In accordance with any one or more of the foregoing embodiments, the computer-readable instructions cause the processor to initiate multi-PLC authentication by issuing an authentication challenge to the programming application, receiving a response to the authentication challenge from the programming application, providing the authentication challenge and the response from the programming application to other safety PLCs over the safety network for verification, receiving verification results from the other safety PLCs over the safety network, and allowing the programming application to download the PLC programming to the safety PLC if a minimum number of safety PLCs has communicated over the safety network that the response from the programming application is acceptable.

In accordance with any one or more of the foregoing embodiments, the safety PLC is a master safety PLC and the computer-readable instructions further cause the processor to tally the verification results received from the other safety PLCs and issue an accept command over the safety network if a minimum number of safety PLCs has communicated over the safety network that the response from the programming application is acceptable.

In accordance with any one or more of the foregoing embodiments, the minimum number of safety PLCs is a majority of the safety PLCs coupled to communicate over the safety network.

In accordance with any one or more of the foregoing embodiments, the computer-readable instructions further cause the processor to verify the response to the authentication challenge from the programming application and provide a verification result to the other safety PLCs over the safety network.

In accordance with any one or more of the foregoing embodiments, the authentication challenge takes the form of a PoW that is related to a functionality of the programming application, and the computer-readable instructions further cause the processor to select the PoW from a list of predefined PoWs for the programming application stored in the safety PLC.

In general, in another aspect, embodiments of the present disclosure relate to a method of securing a safety network for industrial plant. The method comprises, among other things, providing a plurality of safety PLCs coupled to communicate with one another over the safety network, and initiating multi-PLC authentication of the programming application in response to receiving a request from a programming application to download PLC programming to a safety PLC in the plurality of safety PLCs, where initiating multi-PLC authentication includes issuing an authentication challenge to the programming application.

In accordance with any one or more of the foregoing embodiments, initiating multi-PLC authentication further includes receiving a response to the authentication challenge from the programming application, providing the authentication challenge and the response from the programming application to other safety PLCs over the safety network for verification, receiving verification results from the other safety PLCs over the safety network, and allowing the programming application to download the PLC programming to the safety PLC if a minimum number of safety PLCs has communicated over the safety network that the response from the programming application is acceptable.

In accordance with any one or more of the foregoing embodiments, the safety PLC is a master safety PLC, the method further comprising tallying the verification results received from the other safety PLCs and issuing an accept command over the safety network if a minimum number of safety PLCs has communicated over the safety network that the response from the programming application is acceptable.

In accordance with any one or more of the foregoing embodiments, the minimum number of safety PLCs is a majority of the safety PLCs coupled to communicate over the safety network.

In accordance with any one or more of the foregoing embodiments, initiating multi-PLC authentication includes verifying the response to the authentication challenge from the programming application and providing a verification result to the other safety PLCs over the safety network.

In accordance with any one or more of the foregoing embodiments, the authentication challenge takes the form of a PoW that is related to a functionality of the programming application, and initiating multi-PLC authentication further includes selecting the PoW from a list of predefined PoWs for the programming application stored in the safety PLC.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
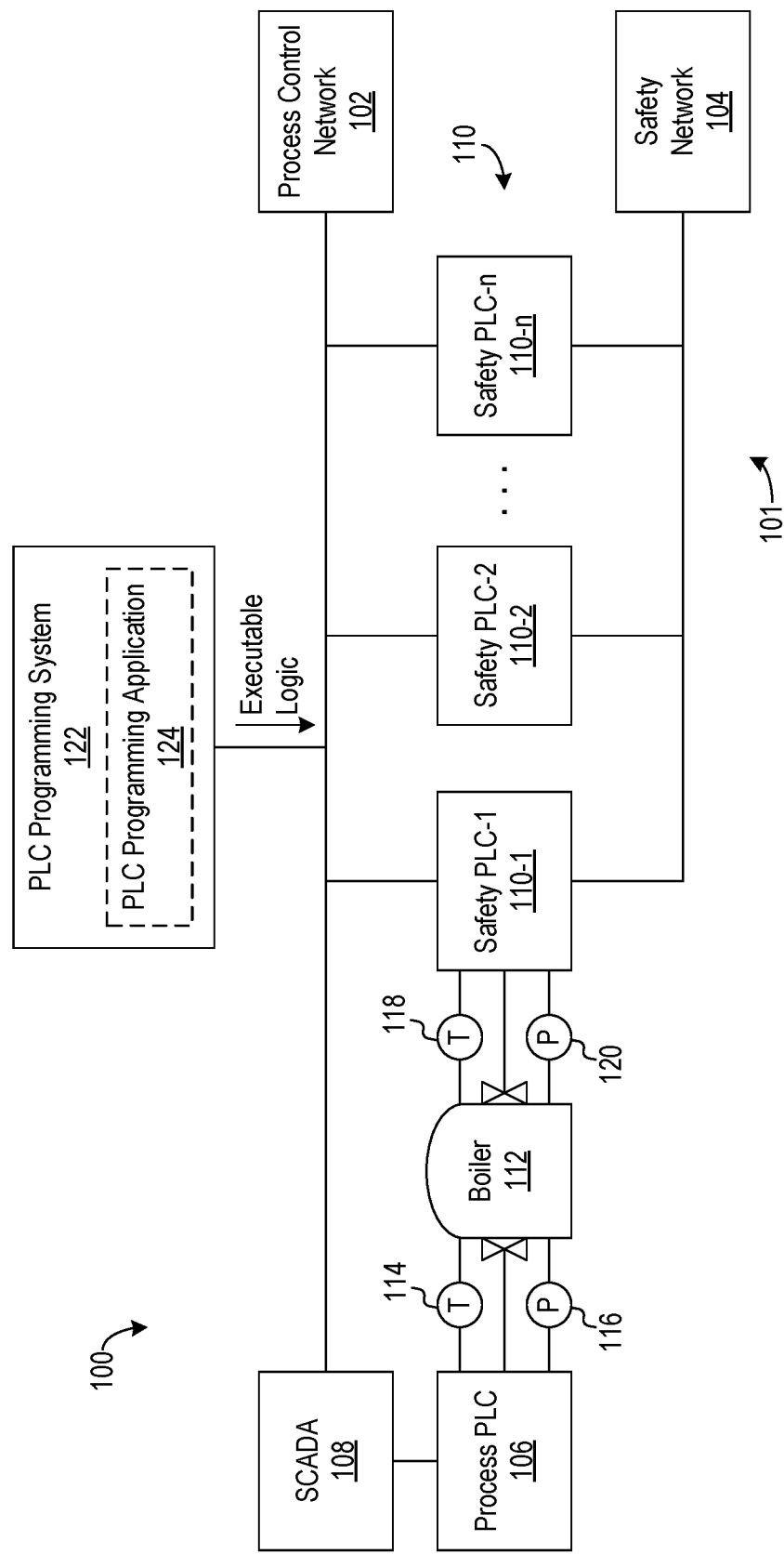
FIG. 1 is a schematic diagram illustrating an industrial plant having a secure network of safety PLCs according to embodiments of this disclosure.

Referring now to FIG. 1, a block diagram of an exemplary industrial plant 100 having a safety system 101 therein is shown according to embodiments of the present disclosure. As can be seen, the exemplary industrial plant 100 has at least two device communication networks, including a process control network 102 and a safety network 104. These networks 102, 104 may be wired networks (e.g., Ethernet, HART, etc.), wireless networks (e.g., Wi-Fi, Bluetooth, etc.), or a combination of wired and wireless networks. In general, the process control network 102 is used for monitoring and controlling plant machinery and equipment and may be accessed by any device authorized to do so, while the safety network 104 is typically accessible only to safety devices and is usually isolated physically ("air gapped") or logically, or both, from non-safety devices for security purposes.

A plurality of process PLCs, only one of which is shown here at 106 for economy, may be connected to the process control network 102, either directly or as part of a Supervisory Control and Data Acquisition (SCADA) system 108. A plurality of safety PLCs 110, only three of which are shown here at 110-1, 110-2, and 110-n for economy, may likewise be connected to the process control network 102 as well as to the safety network 104. Each of the safety PLCs 110 has a unique identification on the process control network 102 and the safety network 104, such as Safety PLC-1, Safety PLC-2, Safety PLC-n, and so on, that is known to (e.g., stored within) every other safety PLC 110. These safety PLCs 110 and the safety network 104 together compose at least part of the safety system 101 for the industrial plant 100. Note also that although the industrial plant 100 uses PLCs in the present example, other types of microprocessor-based control devices, such as remote terminal units (RTU), may also be used with embodiments of the present disclosure.

In general operation, each process PLC 106 monitors one or more operational parameters for certain equipment in the industrial plant 100, such as a boiler 112. The operational parameters are provided to each process PLC 106 by one or more sensors, such as a temperature sensor 114 and a pressure sensor 116, mounted on or near the equipment. Based on these operational parameters, each process PLC 106 may alter or adjust certain operational aspects of the equipment, such as opening or closing an inflow valve, thereby reducing or increasing fluid flow to or from the equipment, and the like, to achieve or maintain certain process objectives.

The safety PLCs 110 also monitor one or more operational parameters for certain equipment in the industrial plant 100, but for safety objectives rather than process objectives. In the FIG. 1 example, Safety PLC-1 monitors one or more operational parameters for the boiler 112 via a temperature sensor 118 and a pressure sensor 120 mounted on or near the boiler 112. Based on these operational parameters, Safety PLC-1 may perform certain safety functions for the boiler 112, such as closing or opening an outflow valve, thereby reducing or increasing fluid flow to or from the boiler 112, and the like, to prevent a boiler malfunction.

Other safety PLCs 110 operate in a similar manner as Safety PLC-1 with respect to other equipment in the industrial plant 100. From time to time, these safety PLCs 110 may need to have their programming updated for various reasons. To this end, a PLC programming system 122 having a PLC programming application 124 thereon is provided on the process control network 102. The PLC programming application 124 includes programming protocols and specific functionality for updating the programming of the safety PLCs 110. For example, the programming application 124 may include a specific compiler that can compile program code into executable logic for running specifically on the safety PLCs 110. The programming application 124 may also include a process that can run the same executable logic that is downloaded to and run by the safety PLCs 110. These protocols and functionality may be commercial off-the-shelf components, or they may be specifically developed for a particular plant safety system application, within the scope of the present disclosure. The programming application 124 may then be used to manually and/or automatically compile and download executable logic to the safety PLCs 110 to update the programming thereof as needed.

In accordance with embodiments the present disclosure, each safety PLC 110 is equipped with authentication capability that checks the PLC programming application 124 before accepting the executable logic therefrom. More specifically, each safety PLC 110 asks the programming application 124 to process or otherwise solve an authentication challenge within a specified time period in order for the safety PLC 110 to accept executable logic from the programming application 124. The safety PLC 110 then sends the authentication challenge to the other safety PLCs 110 on the safety network 104 along with the response provided by the programming application 124 for verification. The other safety PLCs 110 thereafter process the authentication challenge and check the response from the programming application 124. If a majority of the safety PLCs 110 on the safety network 104 determines that the response from the programming application 124 is correct or acceptable, then the programming application is verified and the safety PLC 110 accepts the executable logic.

The authentication challenge may take any form known to those skilled in the art that can be used to authenticate the programming application 124. For example, the authentication challenge may involve a legitimate functionality on the programming application 124, such as compiling some piece of program code, or performing some piece of computational processing that a legitimate programming application 124 would be able to perform, and providing the outcome or output thereof. In some embodiments, the authentication challenge may take the form of a request for a proof-of-work (PoW), which is a piece of computational processing that is typically difficult to complete, but once completed, is relatively easy to verify by working backwards from the outcome or output.

In some embodiments, a majority is determined by dividing the total number of safety PLCs 110 on the safety network 104 and adding one. That is, $M=N/2+1$, where M is the majority and N is the total number of safety PLCs 110 on the safety network 104. If the total number N of safety PLCs 110 is an odd number, then the quotient may be rounded up to the next integer number. In this way, a malicious application would need to hijack multiple safety PLCs 110 concurrently on the safety network 104 before executable logic could be downloaded to any one safety PLC 110. In some embodiments, if a safety PLC 110 on the safety network 104 fails to provide verification or otherwise respond within a specified time period, then that safety PLC 110 is not counted in the determination of a majority (i.e., the non-responding safety PLC is subtracted from the total number N of safety PLCs 110). In other embodiments, a non-responding safety PLC 110 is counted as a negative result in the determination of a majority (i.e., the response to the authentication challenge from the programming application 124 is considered incorrect or unacceptable).

In some embodiments, although each safety PLC 110 receives verification results from the other safety PLCs 110 on the safety network 104, one of the safety PLCs 110 may be randomly nominated as a master safety PLC for purposes of tallying the verification results. The random nomination may occur on a regularly scheduled basis, or it may occur each time an attempt to program or reprogram any of the safety PLCs 110 on the safety network 104 is detected. The nominated master safety PLC then tallies the verification results from all safety PLCs 110 on the safety network 104 and issues an acceptance or rejection command to all safety PLCs 110 on the safety network 104. The safety PLCs 110 on the safety network 104 then accept or reject the reprogramming attempt accordingly.

Figure 2:
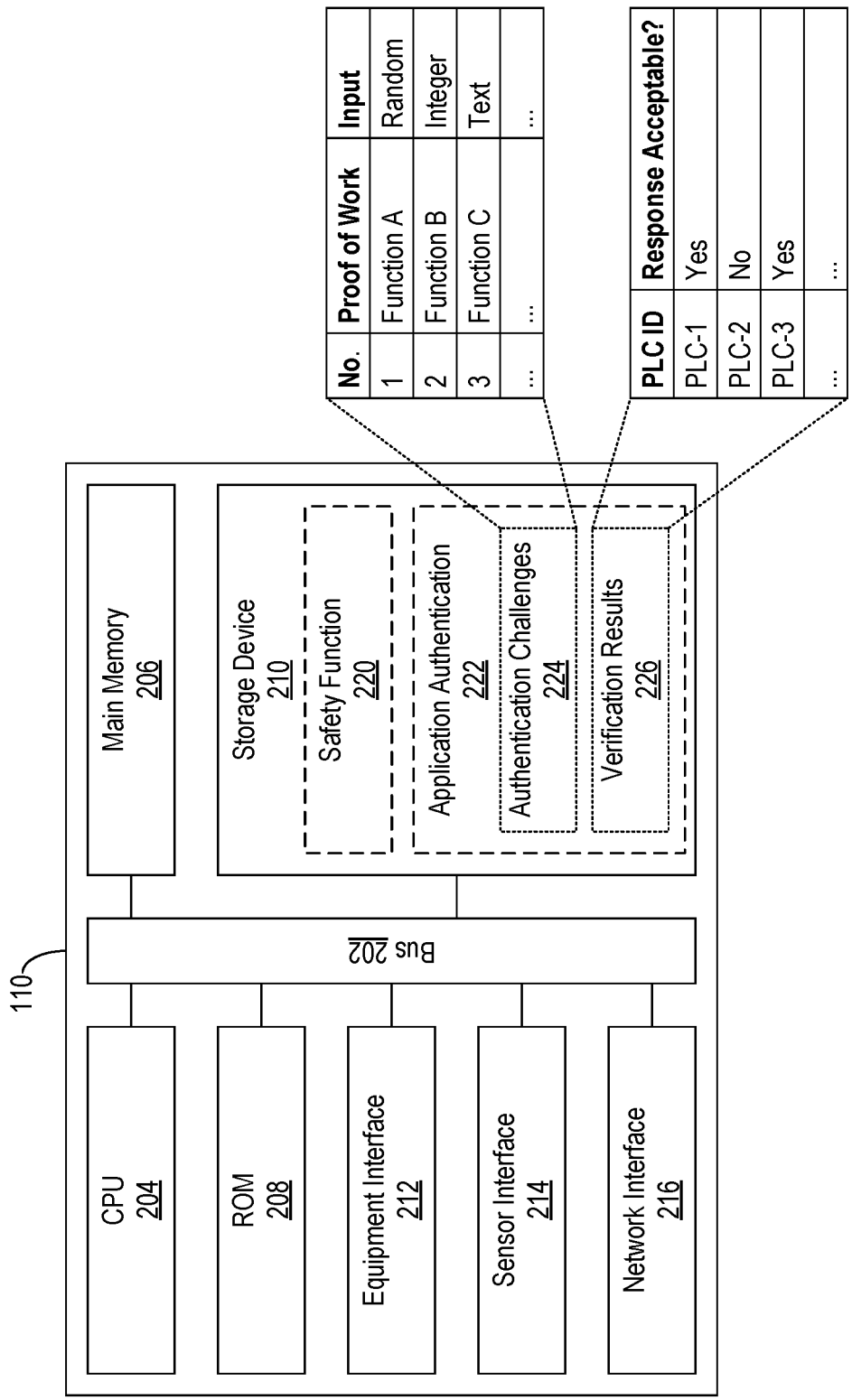
FIG. 2 is a block diagram illustrating an exemplary architecture for a safety PLC according to embodiments of this disclosure.

FIG. 2 is a block diagram illustrating an exemplary safety PLC 110 in accordance with embodiments of the present disclosure. In one embodiment, the safety PLC 110 includes a bus 202 or other communication pathway for transferring data within the control system, and a CPU 204, which may be any suitable microprocessor or microcontroller, coupled with the bus 202 for processing the information. The safety PLC 110 may also include a main memory 206, such as a random-access memory (RAM) or other dynamic storage device coupled to the bus 202 for storing computer-readable instructions to be executed by the CPU 204. The main memory 206 may also be used for storing temporary variables or other intermediate information during execution of the instructions executed by the CPU 204.

The safety PLC 110 may further include a read-only memory (ROM) 208 or other static storage device coupled to the bus 202 for storing static information and instructions for the CPU 204. A computer-readable storage device 210, such as a nonvolatile memory (e.g., Flash memory) or a magnetic disk, may be coupled to the bus 202 for storing information and instructions for the CPU 204. The CPU 204 may also be coupled via the bus 202 to an equipment interface 212 for allowing the safety PLC 110 to communicate with plant equipment connected thereto (e.g., boiler 112). A sensor interface 214 may be coupled to the bus 202 for allowing the safety PLC 110 to communicate with various plant sensors (e.g., sensors 118, 120) mounted on or near the plant equipment. A network interface 216 may be coupled to the bus 202 for allowing the safety PLC 110 to communicate with plant networks (e.g., networks 102, 104), and the like.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, Flash, optical or magnetic disks, such as the storage device 210. Volatile media may include dynamic memory, such as main memory 206. Transmission media may include coaxial cables, copper wire and fiber optics, including wires of the bus 202. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a device can read.

A safety function 220, or the computer-readable instructions therefor, may also reside on or be downloaded to the storage device 210. The safety function 220 may then be executed by the CPU 204 and other components to automatically detect abnormal operational parameters for the plant equipment (e.g., boiler 112) and initiate one or more safety actions. To protect the safety function 220 from being altered by a malicious application, an application authentication module 222, or the computer-readable instructions therefor, may also reside on or be downloaded to the storage device 210. The application authentication module 222 detects attempts to program or reprogram the safety PLC 110 and applies multi-PLC verification to check the programming application. Such an application authentication module 222 may be written in any suitable computer programming language known to those skilled in the art using any suitable software development environment. Examples of suitable programming languages include IEC61131-3, C, C++, C#, Python, Java, Perl, and the like.

The application authentication module 222 may include, or have access to, one or more authentication challenges, indicated at 224, for testing the programming application. In some embodiments, the authentication challenges 224 may take the form of a proof-of-work (PoW) request that requires the programming application to perform some computational challenge. As mentioned earlier, such PoW requests are typically difficult to solve, but once solved, are relatively easy to verify by working in reverse. Suitable proof-of-works may be developed using IEC 61131-3 Functional Block Diagrams or Structured Texts, which are standard programming languages specified for programmable logic controller. Exemplary proof-of-works are designated as Function A, Function B, Function C, and so on in FIG. 2 for illustrative purposes, along with the inputs for each proof-of-work.

The application authentication module 222 may further include, or have access to, verification results from each safety PLC 110 on the safety network 104. As discussed previously, the application authentication module 222 employs multi-PLC verification to test a programming application. This entails the application authentication module 222 sending the proof-of-work to each safety PLC 110 on the safety network 104 along with the response from the programming application for verification. Each safety PLC 110 processes the proof of work against the response from the programming application and sends the result to the other safety PLCs 110 on the safety network 104. In the FIG. 2 example, the verification results are listed according to the unique identification for each safety PLC and whether the safety PLC determined the response from the programming application to be acceptable.

Figure 3:
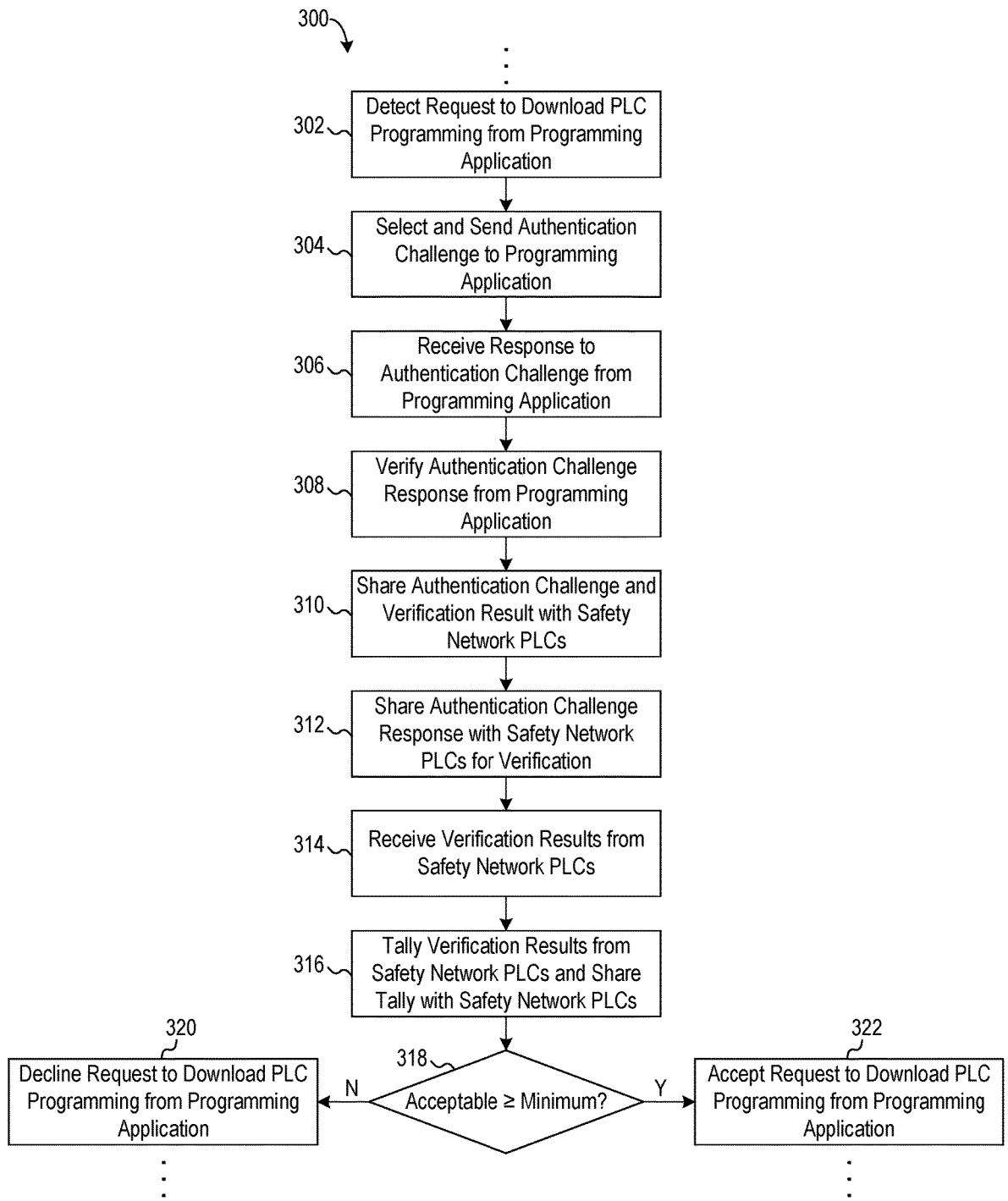
FIG. 3 is a flow diagram illustrating a method of authenticating a programming application by a target safety PLC according to embodiments of this disclosure.

Referring now to FIG. 3, a flow diagram illustrating a method 300 that may be used with the safety PLC for checking a PLC programming application according to embodiments of the present disclosure. The method generally begins at block 302 when the safety PLC detects a request or attempt by the programming application to download PLC programming, typically in the form of executable logic, the safety PLC. At block 304, the safety PLC selects and sends an authentication challenge, such as a proof-of-work request, to the programming application along with any needed information to process the authentication challenge, such as the inputs to the proof-of-work. At block 306, the safety PLC receives a response to the authentication challenge from the programming application, and at block 308, the safety PLC verifies the response to the authentication challenge.

At block 310, the safety PLC shares the authentication challenge and the verification it performed with the other safety PLCs on the safety network. In some embodiments, the safety PLC may share the authentication challenge by sending an identifier, such as a reference number, for the authentication challenge to the other safety PLCs on the safety network along with any information needed to process the authentication challenge. At block 312, the safety PLC also shares the response to the authentication challenge received from the programming application for verification purposes. At block 314, the safety PLC receives verification results from the other safety PLCs on the safety network, and at block 316, the safety PLC tallies the verification results and shares the tally with the other safety PLCs on the safety network.

At block 318, a determination is made whether the tally from block 316 shows the number of acceptable results is greater than or equal to a minimum threshold. In some embodiments, the minimum threshold is a majority of the number of safety PLCs on the safety network. In some embodiments, the minimum threshold is a majority of the safety PLCs on the safety network that responded within a specified time period. If the determination is no, then the safety PLC declines the PLC programming from the program application at block 320. If the determination is yes, then the safety PLC accepts the PLC programming from the programming application at block 322.

In some embodiments, rather than performing a tally at block 316 and assessing the tally results at block 318, the safety PLC may wait for a randomly nominated master safety PLC to perform the tally and send an acceptance or rejection command to the safety PLC. As mentioned earlier, the random nomination of the master safety PLC may occur on a regularly scheduled basis, or it may occur each time there is an attempt to program or reprogram any of the safety PLCs on the safety network.

Figure 4:
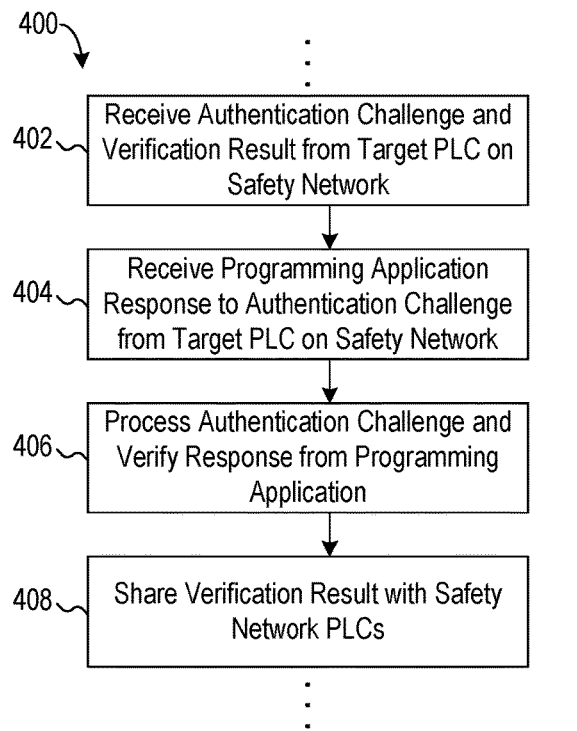
FIG. 4 is a flow diagram illustrating a method of authenticating a programming application by another safety PLC according to embodiments of this disclosure.

Note that the method 300 in FIG. 3 proceeds from the perspective of the safety PLC that was targeted for reprogramming. Following now in FIG. 4 is a flow diagram illustrating a method 400 that may be used with other, non-target safety PLCs on the safety network for checking a PLC programming application according to embodiments of the present disclosure. The method 400 generally begins at block 402, where these other safety PLCs receive an authentication challenge, or information identifying the authentication challenge, and a verification result therefor from the target safety PLC on the safety network. In some embodiments, this authentication challenge takes the form of a proof-of-work as described above. At block 404, the safety PLCs also receive from the target safety PLC a response to the authentication challenge that was provided by a programming application. At block 406, the safety PLCs process the authentication challenge and verify the response by the programming application, and at block 408, each safety PLC shares its verification result with the other safety PLCs on the safety network.

Figure 5:
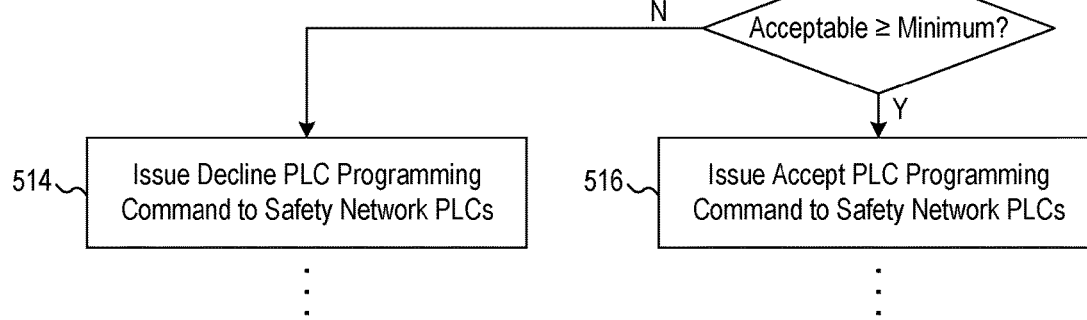
FIG. 5 is a flow diagram illustrating a method of authenticating a programming application by a master safety PLC according to embodiments of this disclosure.

FIG. 5 is a flow diagram illustrating a method 500 that may be used with a master safety PLC on the safety network for checking a PLC programming application according to embodiments of the present disclosure. The method 500 is similar to the method 400 in FIG. 4 insofar as it generally begins at block 502, where the safety PLC safety receives an authentication challenge, or information identifying the authentication challenge, and a verification result therefor from the target safety PLC on the safety network. Again, this authentication challenge can take the form of a proof-of-work as described above. At block 504, the master safety PLC also receives from the target safety PLC a response to the authentication challenge that was provided by a programming application. At block 506, the master safety PLC processed the authentication challenge and verifies the response by the programming application, and at block 508, the master safety PLC shares its verification result with the other safety PLCs on the safety network.

In some embodiments, the targeted safety PLC may also be nominated as the master safety PLC. In such embodiments, the targeted master safety PLC may use both the method 300 of FIG. 3 and the method 500 of FIG. 5 in combination.

In addition to the above, the master safety PLC also tallies the verification results from the safety PLCs on the safety network at block 510. The master safety PLC thereafter determines at block 512 whether the tally shows the number of acceptable results is greater than or equal to a minimum threshold. In some embodiments, the minimum threshold is a majority of the number of safety PLCs on the safety network. In some embodiments, the minimum threshold is a majority of the safety PLCs on the safety network that responded within a specified time period. If the determination is no, then the master safety PLC issues a command to all safety PLCs on the safety network declining the PLC programming from the program application at block 514. If the determination is yes, then the master safety PLC issues a command to all safety PLCs on the safety network accepting the PLC programming from the programming application at block 516.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A safety system for an industrial plant, comprising:
 a safety network in the industrial plant, the safety network physically or logically isolated from non-safety devices in the industrial plant;
 a plurality of safety programmable logic controllers (PLCs) coupled to communicate with one another over the safety network, each safety PLC operable to perform one or more safety functions related to a respective equipment in the industrial plant;
 an outflow valve in communication with a target safety PLC;
 wherein each safety PLC is operable to communicate with a programming application running on a safety system over the safety network to initiate a multi-PLC authentication challenge of the programming application in response to a request by the programming application to download a PLC program to the target safety PLC;
 wherein in response to the multi-PLC authentication challenge, one of the plurality of safety PLCs is randomly selected as a master safety PLC;
 each of the plurality of safety PLCs issues an authentication challenge to the programming application;
 each of the plurality of safety PLCs receives a response to the authentication challenge from the programming application and generates verification results;
 each of the plurality of safety PLCs determines whether the verification results are acceptable and provides the verification results to the master safety PLC;
 the master safety PLC determines whether the number of acceptable results are greater than or equal to a minimum threshold;
 wherein the programming application running on the safety system downloads the PLC program to the target safety PLC if the master safety PLC determines the number of acceptable results are greater than or equal to the minimum threshold; and
 wherein the target safety PLC opens and closes the outflow valve using the downloaded program.

2. The safety system of claim 1, wherein the minimum number of safety PLCs is a majority of the safety PLCs coupled to communicate over the safety network.

3. The safety system of claim 1, wherein each safety PLC is further operable to verify the response to the authentication challenge from the programming application and provide a verification result to the other safety PLCs coupled to communicate over the safety network.

4. The safety system of claim 1, wherein the authentication challenge takes the form of a proof-of-work (PoW) that is related to a functionality of the programming application.

5. The safety system of claim 4, wherein each safety PLC is further operable to select the PoW from a list of predefined PoWs for the programming application stored in each safety PLC.

6. A target safety PLC for an industrial plant, comprising:
 a processor;
 an outflow valve in communication with the target safety PLC;
 a network interface connected to the processor, the network interface allowing the target safety PLC to communicate with a plurality of other safety PLCs in the industrial plant over a safety network, the safety network physically or logically isolated from non-safety devices in the industrial plant; and
 a storage device connected to the processor, the storage device storing computer-readable instructions thereon that, when executed by the processor, cause the processor to communicate with a programming application running on a safety system over the safety network to initiate a multi-PLC authentication challenge of the programming application in response to a request by the programming application to download a PLC program to the target safety PLC;
 wherein in response to the multi-PLC authentication challenge, one of the plurality of safety PLCs is randomly selected as a master safety PLC;
 each of the plurality of safety PLCs issues an authentication challenge to the programming application;
 each of the plurality of safety PLCs receives a response to the authentication challenge from the programming application and generates verification results;
 each of the plurality of safety PLCs determines whether the verification results are acceptable and provides the verification results to the master safety PLC;

the master safety PLC determines whether the number of acceptable results are greater than or equal to a minimum threshold;

wherein the programming application running on the safety system downloads the PLC program to the target safety PLC if the master safety PLC determines the number of acceptable results are greater than or equal to the minimum threshold; and wherein the target safety PLC opens and closes the outflow valve using the downloaded program.

7. The target safety PLC of claim 6, wherein the master safety PLC and the computer-readable instructions further cause the processor to tally the verification results received from the other safety PLCs and issue an accept command over the safety network if a minimum number of safety PLCs has communicated over the safety network that the response from the programming application is acceptable.

8. The target safety PLC of claim 6, wherein the minimum number of safety PLCs is a majority of the safety PLCs coupled to communicate over the safety network.

9. The target safety PLC of claim 6, wherein the computer-readable instructions further cause the processor to verify the response to the authentication challenge from the programming application and provide a verification result to the other safety PLCs over the safety network.

10. The target safety PLC of claim 6, wherein the authentication challenge takes the form of a proof-of-work (PoW) that is related to a functionality of the programming application.

11. The target safety PLC of claim 10, wherein the computer-readable instructions further cause the processor to select the PoW from a list of predefined PoWs for the programming application stored in the safety PLC.

12. A method of securing a safety network for industrial plant, comprising:

providing a plurality of safety PLCs coupled to communicate with one another over the safety network, the safety network physically or logically isolated from non-safety devices in the industrial plant;

providing an outflow valve in communication with a target safety PLC;

the target safety PLC communicating with a programming application running on a safety system over the safety network to initiate a multi-PLC authentication challenge of the programming application in response to receiving a request from the programming application to download a PLC program to the target safety PLC of the plurality of safety PLCs;

randomly selecting one of the safety PLCs as a master safety PLC from among the plurality of safety PLCs in response to the multi-PLC authentication challenge;

issuing, by each of the plurality of safety PLCs, an authentication challenge to the programming application;

receiving, by each of the plurality of safety PLCs, a response to the authentication challenge from the programming application and generating verification results;

determining, by each of the plurality of safety PLCs, whether the verification results are acceptable and providing the results to the master safety PLC;

determining, by the master PLC, whether the number of acceptable results are greater than or equal to a minimum threshold;

downloading the PLC program on the target PLC by the programming application running on the safety system if the master safety PLC determines the number of acceptable results are greater than or equal to the minimum threshold; and opening and closing the outflow valve by the target safety PLC using the downloaded program.

13. The method of claim 12, further comprising the master safety PLC tallying the verification results received from the other safety PLCs and issuing an accept command over the safety network if a minimum number of safety PLCs has communicated over the safety network that the response from the programming application is acceptable.

14. The method of claim 12, wherein the minimum number of safety PLCs is a majority of the safety PLCs coupled to communicate over the safety network.

15. The method of claim 12, wherein initiating multi-PLC authentication includes verifying the response to the authentication challenge from the programming application and providing a verification result to the other safety PLCs over the safety network.

16. The method of claim 12, wherein the authentication challenge takes the form of a proof-of-work (PoW) that is related to a functionality of the programming application.

17. The method of claim 16, wherein initiating multi-PLC authentication further includes selecting the PoW from a list of predefined PoWs for the programming application stored in the safety PLC.

\* \* \* \* \*